(12) United States Patent
Cruz (10) Patent No.: US 6,282,665 B1
(45) Date of Patent: Aug. 28, 2001

(54) METHOD AND APPARATUS TO REDUCE POWER CONSUMPTION ON A BUS

(75) Inventor: Claude A. Cruz, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/519,131

(22) Filed: Mar. 6, 2000

Related U.S. Application Data

(63) Continuation of application No. 09/001,816, filed on Dec. 31, 1997, now Pat. No. 6,131,167.

(51) Int. Cl.[7] ....................................................... G06F 1/26
(52) U.S. Cl. ........................... 713/320; 713/300; 713/324
(58) Field of Search .................................... 713/320, 300, 713/310, 322, 323, 224, 330, 340; 365/226, 227, 229

(56) References Cited

U.S. PATENT DOCUMENTS

| 5,404,544 | * | 4/1995 | Crayford | 713/323 |
|---|---|---|---|---|
| 5,666,540 | * | 9/1997 | Hagiwara et al. | 713/324 |
| 5,692,197 | * | 11/1997 | Narad et al. | 713/300 |
| 5,737,258 | * | 4/1998 | Choi | 365/63 |
| 5,751,925 | * | 5/1998 | Kataoka et al. | 395/115 |

\* cited by examiner

*Primary Examiner*—Ario Etienne
(74) *Attorney, Agent, or Firm*—Blakely, Sokoloff, Taylor & Zafman LLP (57) ABSTRACT

Method and apparatus for reducing the power consumed by a bus. In one embodiment, the method may comprise placing a bus node in a reduced power consumption state wherein the signaling integrity of a multiport bus interface continues such that The multiport bus interface forwards messages received when the bus node is in the reduced power consumption state. The bus node is returned from the reduced power consumption state to a fully powered state upon receiving one of a plurality of wake events that may serve other purposes as normal signaling on the bus. In one embodiment, an apparatus may comprise complex logic to control what state the apparatus is in; a link circuit coupled to the complex logic; and a physical layer (PHY) coupled to the link circuit to provide a bus interface. The PHY and the link circuit remain active when the apparatus is in a particular state, such as reduced power state. In this way, the apparatus may act as a repeater for traffic on the bus.

16 Claims, 9 Drawing Sheets

METHOD AND APPARATUS TO REDUCE POWER CONSUMPTION ON A BUS

This is a continuation of application Ser. No. 09/001,816, filed Dec. 31, 1997 now U.S. Pat. No. 6,131,167.

BACKGROUND OF THE INVENTION

1. Field of the Invention

This invention relates in general to the field of digital systems, and, more particularly, to reducing the power requirements of digital systems. Specifically, the invention relates to a method and apparatus for reducing the power consumed by a bus.

2. Description of the Related Art

With the growing complexity of modern computer systems, designers are constantly seeking more efficient methods to reduce power consumption. Modem computer systems may contain several microprocessors, microcontrollers, and other digital devices connected to each other by a bus. The bus transports data among the microprocessors and other components, and is composed of a number of wirelike connections that function as information-transfer lines, which may be located on a "motherboard" (i.e., main printed circuit board).

Figure 1A:
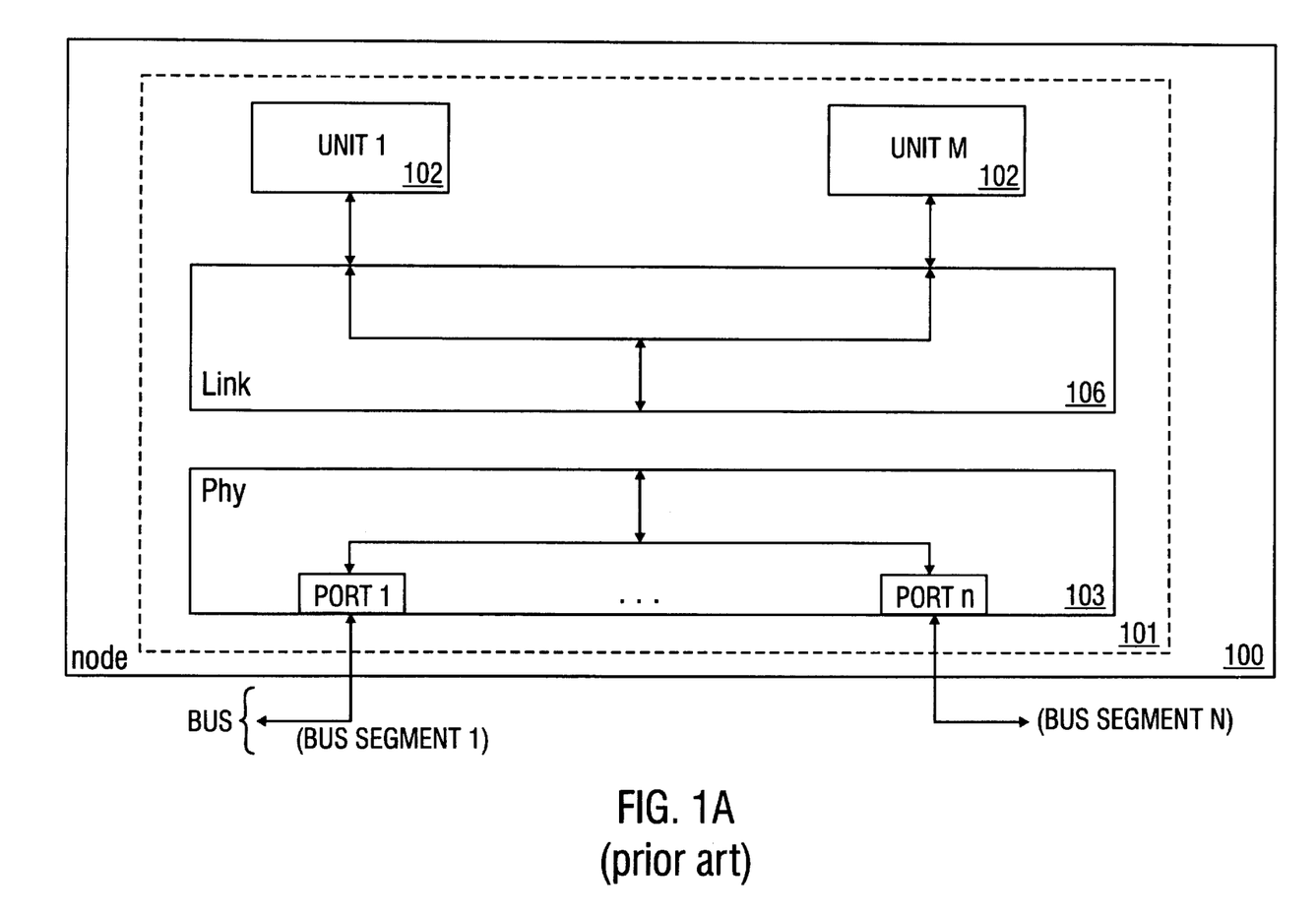
FIG. 1A illustrates components within a prior art node.

A "bus node" or "node," as used in the art, comprises a set of functional entities (e.g., a memory, processor, etc.) which share a common interface to a bus (e.g., the IEEE 1394–1995 serial bus). FIG. 1A illustrates a nodal configuration for a 1394 "node" 100, which consists of a 1394 bus interface 101 together with one or more "units" (e.g., disk drives, modems, computers, etc.) 102, which share the node's common bus interface 101. One skilled in the art would appreciate that the node 100 may also include other types of logic circuits that have not been shown. FIG. 1A also indicates that the bus interface 101 consists of two subsections, one of which is a "physical layer" or "PHY" 103, which provides an electrical bus interface. The physical layer 103 includes one or more bus "ports" 104, which are connection points for bus cable segments 105. Collectively, the bus cable segments 105 constitute a 1394 bus (not shown).

The other layer within the bus interface circuit 101 is a "link layer" or "link" 106, which provides a packet interface between the physical layer 103 and the node's unit(s) 102. The link 106 layer may be used to analyze the data within a received request to determine if one of its local units is the targeted (i.e., destination) unit. If so, the link layer 106 would forward the request to the targeted unit. In any event, the physical layer 103, retransmits the signal on the bus to all ports. A 1394 bus consists of a collection of port-to-port connections between physical layers of several nodes, with each node providing internal signal routing between the ports on that physical layer.

Figure 1B:
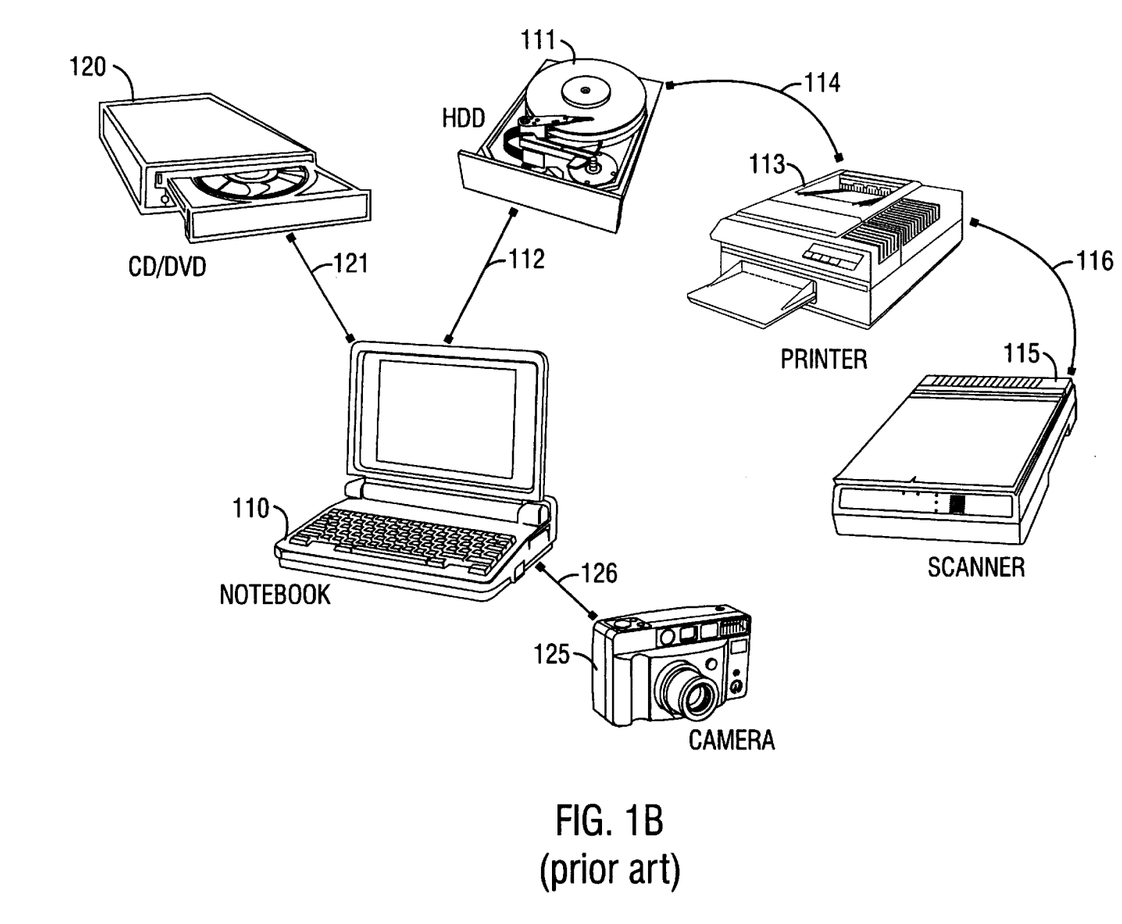
FIG. 1B illustrates a prior art bus system with point-to-point connections.

FIG. 1B illustrates a notebook computer 100 with a hard disk drive 111 connected by a cable 112. The hard disk drive 111 is connected to a printer 113 by a cable 114, and the printer 113 is connected to a scanner 115 by cable 116. The notebook 110 is also connected to a Compact Disk or DVD drive 120 by a cable and to a digital camera 125 by cable 126. The cables 106, 111, 116, 121, 126 are cables in a bus (e.g., IEEE Std 1394–1995) that has point-to-point connections, which allows these devices to be connected to one another in any desired configuration. A 1394 bus, for example, may also be used to connect internal devices to a platform (e.g., connecting an internal primary hard disk to the notebook computer 110).

Point-to-point connections enable communication to occur by having intermediate devices forward information to the desired receiving device. For example, if a picture was scanned into the scanner 115 to be stored on the CD-ROM 120, the scanner would forward the data to the printer 113 (as well as to any other device which might be attached to another port on the scanner). The printer 113 would forward the data to the hard disk drive 111, which would forward the data to the notebook 110 and then to the CD-ROM 120. One skilled in the art will appreciate that even though the data was not directed to the printer 113, hard disk drive 111, or notebook 111, each plays a role in making sure that the data arrives at the intended destination.

Figure 2A:
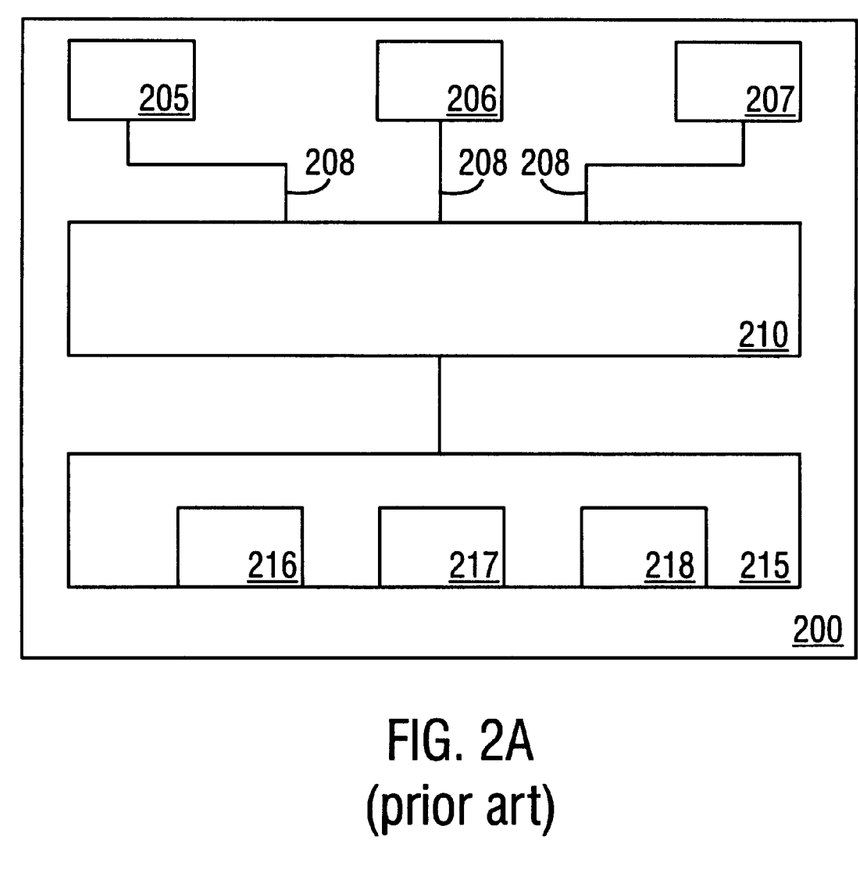
FIG. 2A is a block diagram illustrating the connections of components within a prior art node on a bus.
Figure 2B:
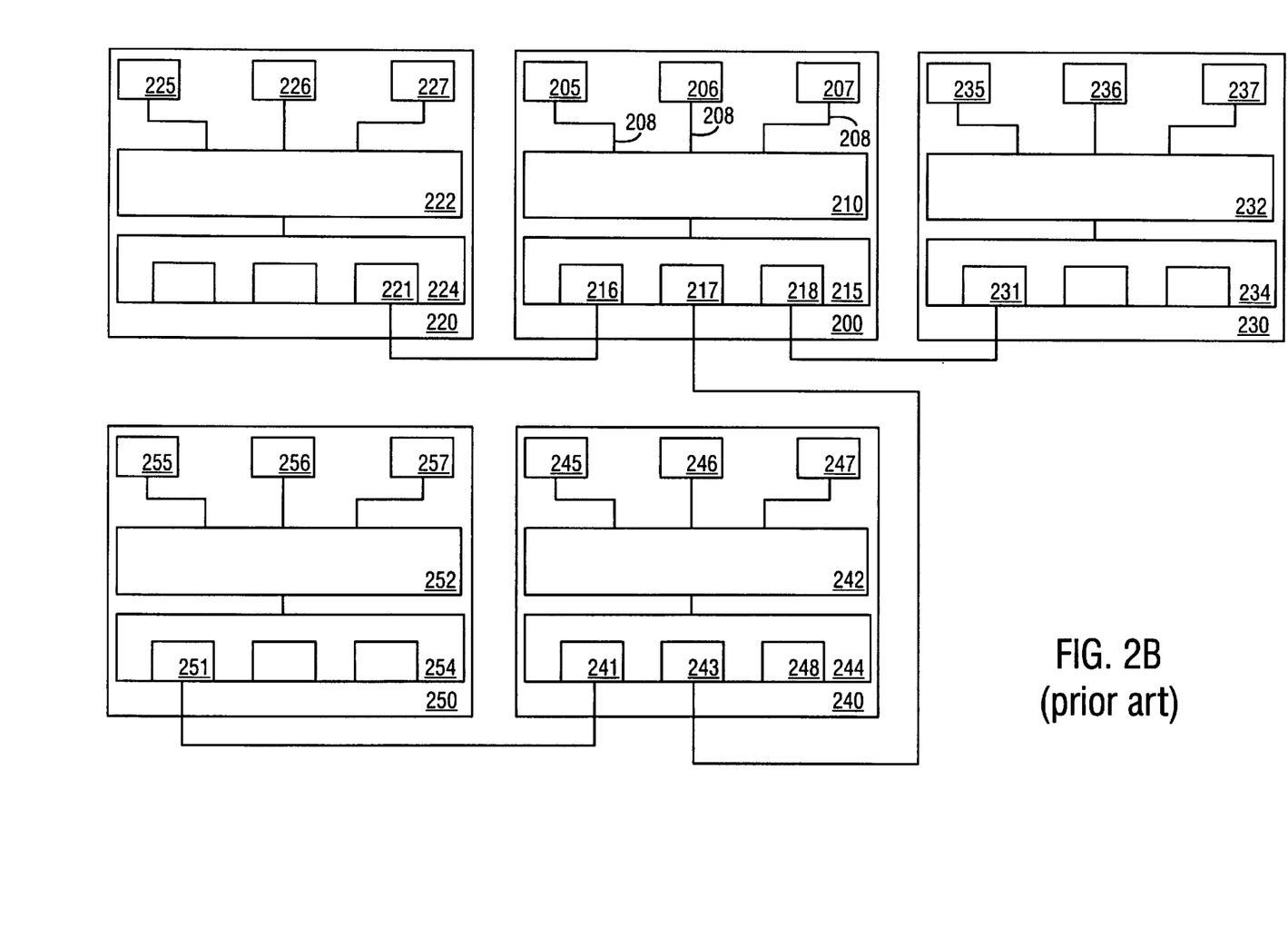
FIG. 2B is a block diagram of prior art system having a plurality of interconnected nodes.

In FIG. 2A, a node 200 includes three units 205–207 connected to a link logic circuit 210 by the cables 208. The physical layer 215 includes three ports 216–218, which enable the node 200 to be connected to as many as three other nodes. One skilled in the art will appreciate that the other physical layers illustrated include more or fewer ports than the three illustrated here. FIG. 2B illustrates a connection of the node 200 to nodes 220, 230, and 240. Specifically, the ports 216, 218 are connected to ports 221 and 231 within the nodes 220 and 230, respectively. The port 217 is coupled to a port 243 of the node 240; the port 251 of node 250 is also connected to port 241 of node 240.

As previously mentioned, each of the nodes 220, 230, 240, 250 contain a link layer and a physical layer. For example, the node 250 includes the unit devices 255–257, the link logic circuit 252, and the physical layer 254. Though most 1394 nodes include at least one unit, certain nodes may contain only a physical-layer circuit. Such "naked PHY" nodes are often useful in relaying and electrically redriving bus traffic, even though these nodes do not generate or accept their own bus traffic, except as a signal relay.

Observation of FIG. 2B reveals that there is no single cable that connects one node to all of the other nodes. For example, the node 250 is not directly connected to the nodes 200, 220, 230, thereby illustrating the "point-to-point" nature of this type of bus. If the node 200 desires to send data to the node 250, one of the unit devices 205–207 would send the data to the link logic circuit 210. The link logic circuit 210 would send a signal to the physical-layer circuit 215, which would apply that signal to the bus via all of the ports 216–218. The signal travels to the ports 221, 231, 243 of the physical layer of nodes 220, 230, 240, respectively. The physical layers 224, 234, 244 corresponding to the ports 221, 231, 243 forward the signal to their associated link logic circuits 222, 232, 242. These link logic circuits then determine if the packet is addressed to one of their local unit devices (e.g., unit devices 245–247). If so, then each link circuit passes the packet to that link's targeted unit(s).

If, for example, a packet is received through port 243 of physical layer 244, it is retransmitted through ports 241 and 248. In addition, the incoming packet is sent to link logic circuit 242 which determines, through packet address-matching, whether the incoming packet is directed to one of this node's local units 245–247. If so, the link logic circuit 242 then sends the packet to the targeted unit, as well as producing an acknowledgement packet that is sent out through all of node 240's physical ports. In this way, the acknowledgement is forwarded by the node 240 and thus arrives at the original packet source node (i.e., the node 200).

Because some of the nodes function as forwarding mechanisms during the transmission of data on the bus, and due to the point-to-point nature of the bus, it becomes desirable to have both the physical layer and the link logic circuit powered during transmission. When the IEEE 1394–1995 protocol was developed, it was developed with the condition that the physical layer and the link logic circuit remain powered at all times. Some "cable-powered" 1394 devices acquire power for the link layer and/or physical layer from the bus. Alternatively, "self-powered" devices power the local link layer and physical layer from a resident power source, such as a battery or local AC supply ("AC brick").

If, for example, node 200 is providing power for the link circuit 210 and the physical layer 215, then those circuits are said to be powered "locally." Such a node may need to remain fully powered in order to properly power the link logic circuit 210 and the physical layer 215, even when the unit(s) on that node are not in use. For example, if the unit 205 is a camcorder that is not presently in use, node 200 may need to remain fully powered in order to properly power physical layer 215 and link circuit 210. It is desirable to provide a mechanism by which a unit that is not in use may be powered down in order to reduce the power consumption of the attendant node. The present invention is directed to overcoming, or at least reducing the effects of one or more of the problems set forth above.

SUMMARY OF THE INVENTION

This invention provides a method and apparatus for reducing the power consumed by a bus. The method includes placing a bus node in a reduced power consumption state and returning the bus node to a fully powered state.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below as they might be employed in a method and apparatus for reducing the power consumption of a bus. In the interest of conciseness, not all features of an actual implementation are described in this specification. It will be appreciated that in the development of any actual embodiment, numerous implementation-specific decisions must be made to achieve the developer's specific goals, such as compliance with system-related and business-related constraints. Moreover, it will be appreciated that even if such a development effort might be complex and time-consuming, it would nevertheless be a routine undertaking for one of ordinary skill having the benefit of this disclosure.

Overview

As previously mentioned, a bus "node" is any functional block (e.g., a disk storage device, printer, computer, etc.) that is attached to a bus via circuitry that constitutes a "bus interface." The present invention is applicable to any system in which the power consumption of a node's bus interface may be controlled independently from the power state of the rest of the bus node. The invention is particularly beneficial in buses (e.g., the IEEE 1394–1995 high-speed serial bus) that need non-interruptible signaling capability, such that reducing the power consumption on a node does not interfere with normal signaling on the bus.

For a node to be placed in a "standby" (reduced power) state, the local power for the bus interface circuit should be replaced during standby by an alternative power source. (This allows the node's bus interface to remain active as a signal relay while unit(s) within the node are in a low power state.) Additionally, the bus interface circuit is generally configured to activate a "wake" mechanism when a request is received that is directed to one of the units in the sleeping node. One skilled in the art will appreciate that the node may be designated as being in a power conserving state (e.g., a battery-powered notebook computer in a "sleeping" state), even though some of the units within the node are fully powered. When a node is in standby state, the units within the node may not be able to participate in normal bus communications. Typically, a response latency (i.e., the delay between the time a request is sent and the time the node can respond to the bus transaction) is associated with placing a node in a standby state.

When a node is placed in a standby state, it is desirable to have a mechanism and protocol to "awaken" the node (i.e., return it to a fully operational state) in response to bus transactions that are directed to that standing-by node. The present invention defines an arrangement for decoupling the powering of a node's bus interface circuit from the powering of unit(s) within the node. The invention defines and describes a low-power "standby" capability and associated method through which the node can be returned to its normal operating state in response to any one of a set of possible "wake-up" conditions.

Specific Embodiments

As previously mentioned, it is generally desired that a node in a standby state retain the ability to recognize and respond to an attempted access of an event that occurs within the node (e.g., a "telephony" ring indicate signal). Other inter-nodal events may include the arrival of a wake-up "magic packet" received through a LAN (large area network) connection, or falling of the node battery power below a critical threshold level. It may be desirable to initiate "wake-up" of a standing-by node in response to any one or more of these prospective "wake events," as well as other events. Thus, a standby implementation generally includes "wake filtering" logic that is used to induce a nodal wake-up in response to specific types of candidate wake events.

Figure 3:
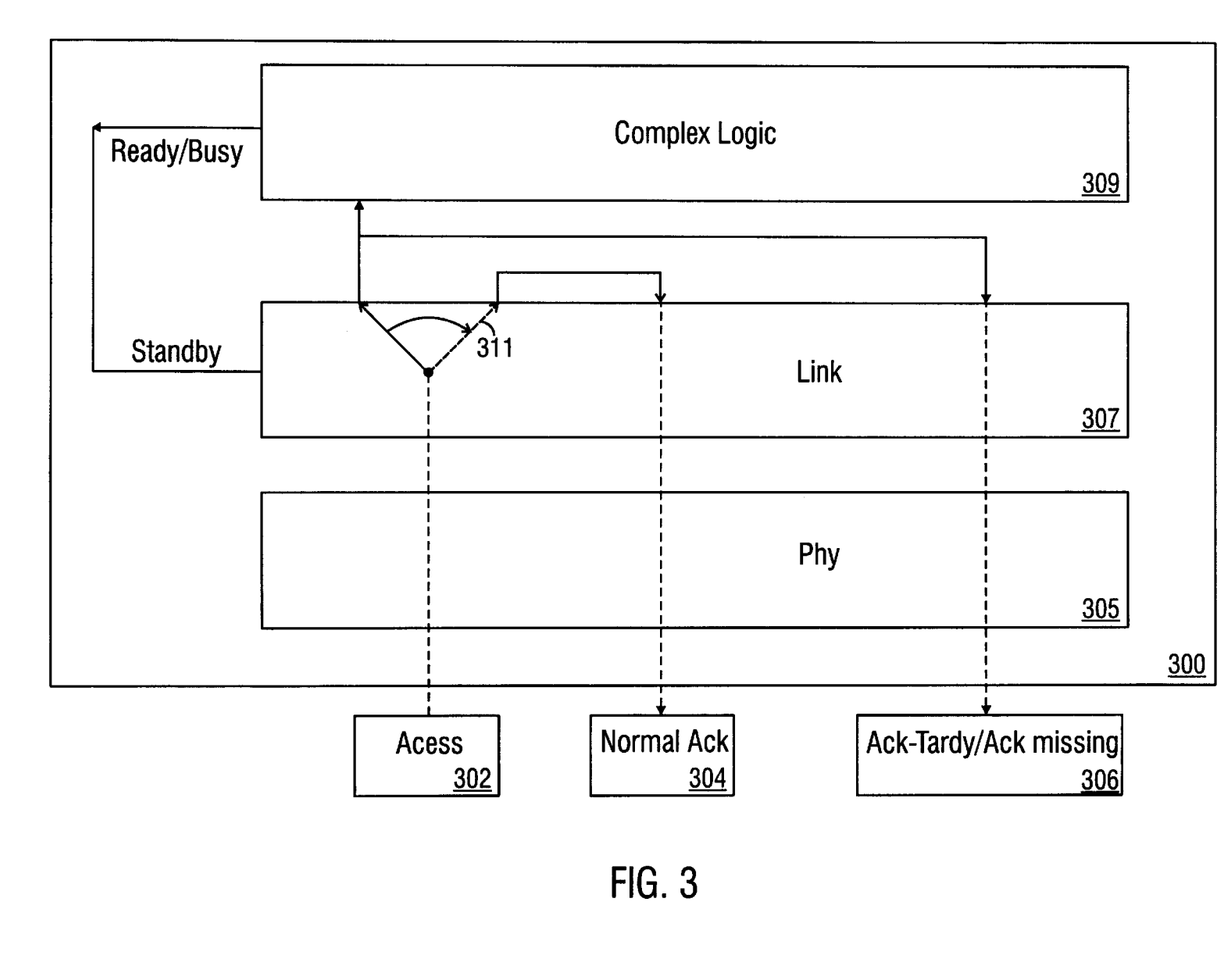
FIG. 3 is a block diagram for a node in accordance with the invention.

FIG. 3 is a block diagram for 1394 node 300 in which a standby and wake protocol in accordance with the invention may be implemented. As previously mentioned, although the 1394 node 300 is used in FIG. 3, the invention is applicable for use with nodes from other types of buses. The node 300 includes a physical layer 305, a link circuit 307, and a complex logic circuit 309. One skilled in the art will appreciate that the complex logic circuit 309 may be a unit device, wake logic device or other types of devices. If the device is not a unit device, it may be used as an interface between the link circuit 309 and the unit device(s) (not shown).

When the node 300 is in a normal operating state, an access request 302 that arrives at the node 300 traverses the physical layer 305 en route to the link circuit 307. The link circuit 307 generates a transaction acknowledgment via a path 311. The successful completion of the access request 302 may be accompanied by the return of an acknowledgement response 304 from the node 300 to the accessing node. Buses other than 1394 may not define such an explicit transaction-acknowledgement mechanism.

Alternatively, the access request 302 may be received when the node 300 is not in a normal operating state. Such a non-normal operating state may occur if the node 300 is communicating with another node or is in a standby state. During this state, the access request 302 is still sent to the link circuit 307. The link circuit 307 may send a response back to the transmitting node indicating that node 300 is in a non-normal state. One skilled in the art will appreciate that the node 300 may not acknowledge the received request. This lack of acknowledgement may be equivalent to the generation of an actual response.

One type of response that the node 300 may send to the sender is an "Ack-tardy" 306. The 1394a standard defines a specific (optionally-implemented) transaction acknowledge code called "Ack-tardy" response. A 1394 link circuit that is not ready to immediately complete a requested transaction can return an Ack-tardy response to the requester to inform the requester that it should retry the request. This provides a software-transparent "wait-state" generation mechanism between the requester and the (standing-by) target node. Note that other buses may not provide a mechanism equivalent to Ack-tardy.

If the access request 302 is attempted to a standing-by node that does not implement the optional Ack-tardy capability, the attempted access may not be acknowledged. The occurrence of an Ack missing response 306 (i.e., no explicit acknowledgment to access attempt) does not necessarily mean that the attempted request 302 has failed, but rather that it is not completed. If the sender knows that the node 300 has standby capability, it can be configured to retry the access request 302 after waiting for a predetermined period to give the node 300, which may have been in standby, a chance to return to its normal operating state.

The bus interface 308, which includes the link circuit 307 and the physical layer 305, is configured so that is can determine when to return a normal Ack response 304 in response to the request 302 and when to return an Ack-tardy/Ack missing response 306. The choice of acknowledgement is dictated by the current operating state of the node 300. If the node 300 is in a normal state, a normal Ack response 302 is returned. Conversely, when the node 300 is in a non-normal (e.g., standby) state, an Ack-tardy/Ack missing response is returned. The selection of the type of response to send to the sender may be achieved by using an input pin on the bus interface 308. In the case of the 1394 node 300, the link circuit 307 may have an input pin that is used to reflect this node's current operating state to the bus interface 308. The specific arrangement for driving this input pin will differ from node to node (e.g. based on type of node unit(s), degree and type of local "intelligence" in the node, etc.). However, the general rule is that if a node is in its normal operating state (i.e., the node is "ready" to respond immediately to accesses), then that node's interface should be configured to return a normal Ack to any access attempts. If, however, the node is in a standby state (i.e. the node is presently "busy" or otherwise unable to respond immediately), then the bus interface 308 should be configured to return an Ack-tardy/Ack missing response 306, as determined by the node's interface capabilities.

Figure 4:
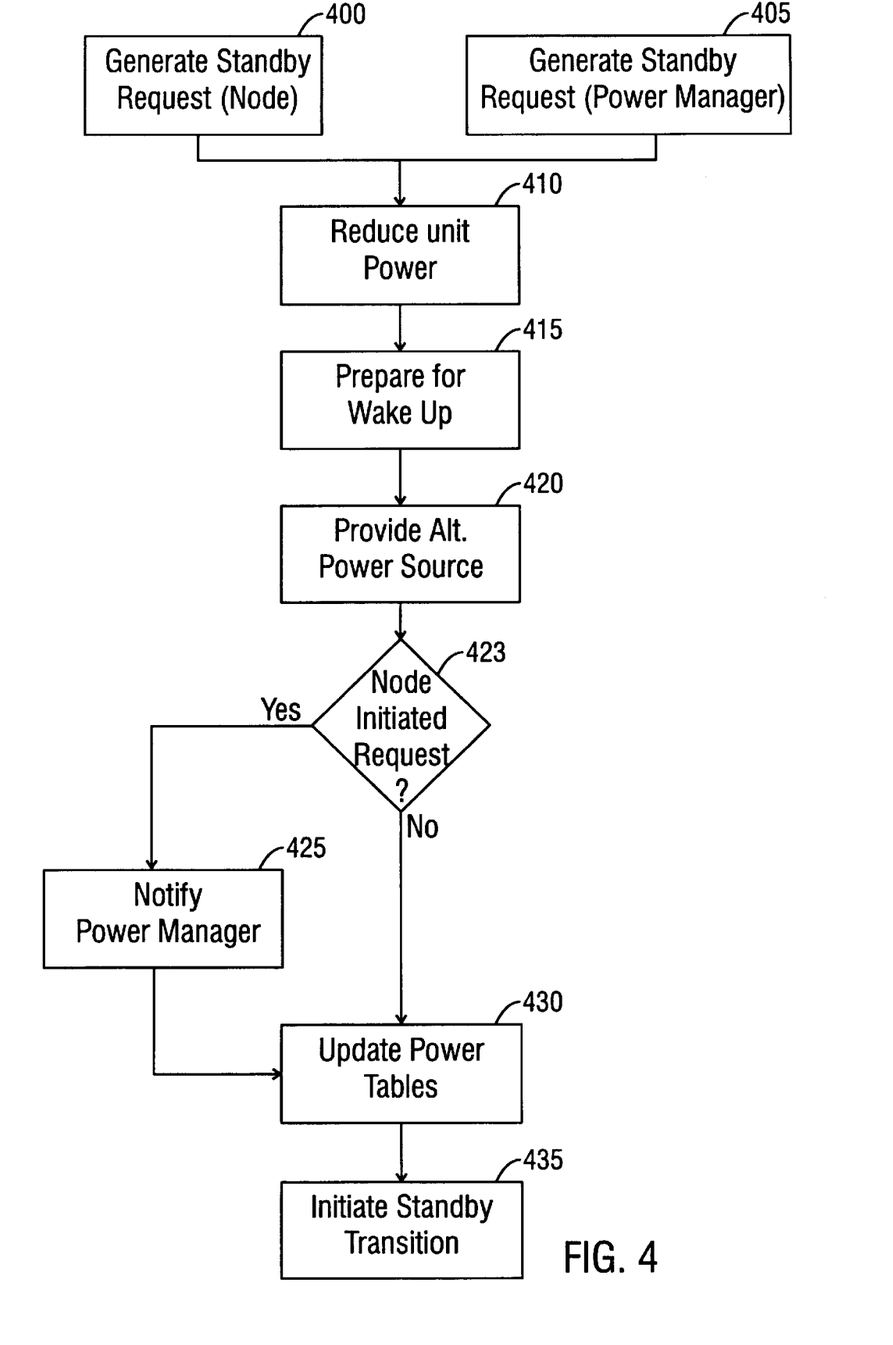
FIG. 4 is a flow chart for reducing the power on a node in accordance with the invention.

FIG. 4 describes, in general terms, how a node enters a low-power standby state. The node may initiate its own entry into a standby state at block 400. For example, a notebook computer may determine that since it has neither sent data to nor received data from its 1394 interface for a specified period, it should enter a standby state to conserve power. Alternatively, the node may receive a request at block 405 to put itself into a standby state from a "bus power manager." When the node receives a request to enter a standby state, at least one of the units within the node is put into a low-power state at block 410.

The node is prepared for subsequent "wake-up," at block 415. The node wake-up capabilities and architecture may vary widely, based on the capabilities and degree of flexibility of the filtering mechanism. For example, certain nodes may include monitoring logic for their local power supply (e.g. battery-state indicator), while others may not. Similarly, some nodes may support wake-up on successful matching of an incoming request with any bus address which is mapped to that node. Other nodes may support more discriminating wake-up based on both address and request type (e.g., read vs. write). A node may thus include "wake-filtering" logic, which can be programmed to generate a unit wake signal to a standing-by node when particular types of access requests occur. One skilled in the art will appreciate that the range of possible filtering options is numerous. Yet, at a minimum a standby-capable node should include a standby "enable" capability which can be used to either allow or disallow that node to wake from a standby state.

The node is also provided with an alternative power source of the bus-interface at block 420, which enables the bus interface circuit to remain active during standby. Power may be received from a bus power cable (e.g., a 1394 cable-power distribution bus). Alternatively, a node may include a small "trickle" power source that is able to power select portions (e.g. the node's wake-up logic) of the node, which should remain active during standby. Providing an alternative power source may necessitate reconfiguring internal power-switching logic to draw power from the appropriate source during standby.

If the node is to initiate its own standby request, as determined at block 423, and the node resides on a bus that includes a bus power-manager entity, the node notifies the bus power manager of its intent to enter the standby state at block 425, assuming that the bus has a power manager. The power manager can properly reflect the node's impending power state in the bus power state tables at block 430. Once that notification has been sent to the manager, the target node is free to initiate its own transition into standby. In contrast, if the target node is to enter the standby state on command from a bus power manager, the bus power tables are updated accordingly. One skilled in the art will appreciate that the updating of power tables enables the nodes, which subsequently want to access the standing-by node, to make the proper assumptions as to access completion to that node.

Figure 5:
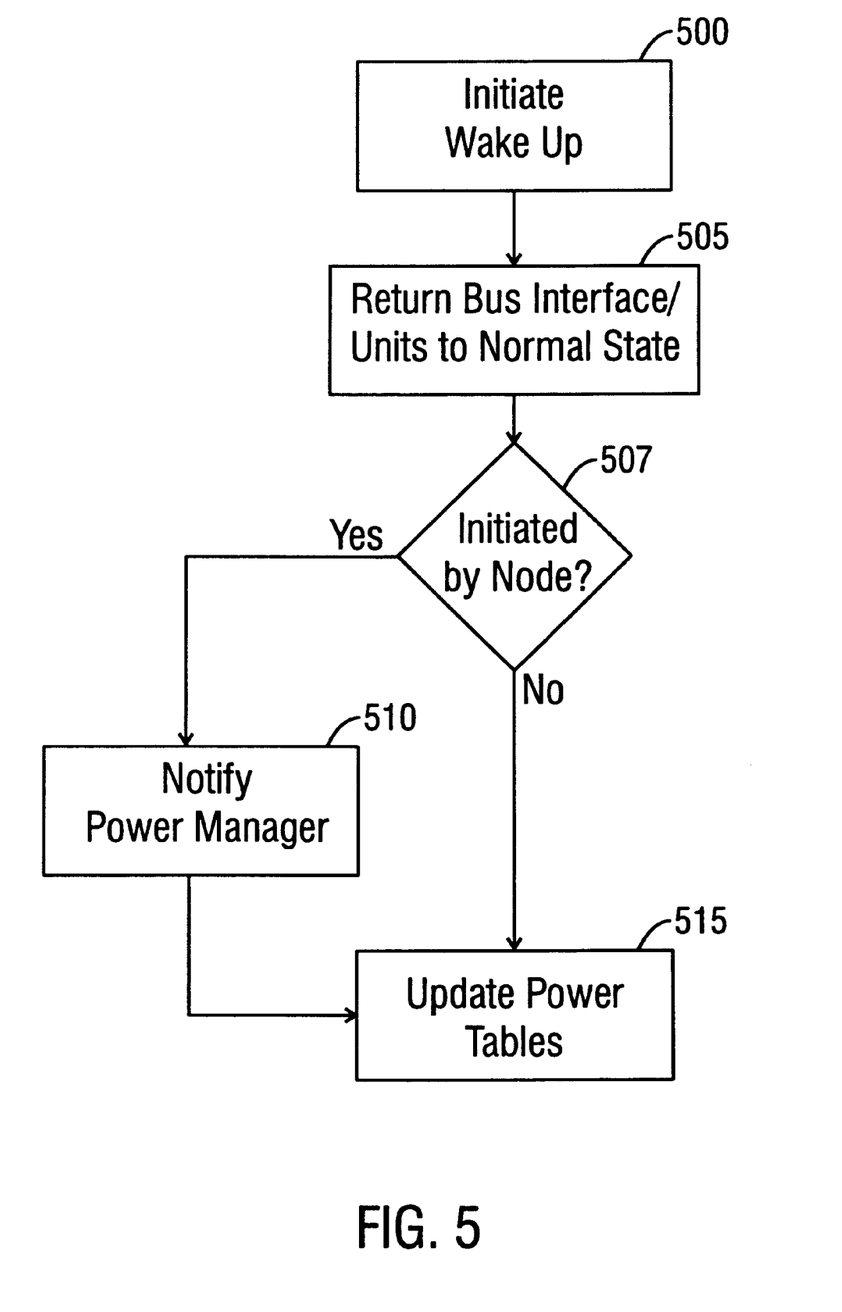
FIG. 5 is a flow chart for restoring the power on a node in accordance with the invention.

FIG. 5 is a high-level depiction of the sequence of events by which a standing-by node may return to a normal operating state. The awakening of a sleeping node is initiated at block 500 by either the target node or a power manager. The specific nature of the qualifying wake event has been previously programmed into the standing-by node's wake logic prior to that node's entry into the standby state. Once a qualifying wake event is received, the target node's bus interface asserts a "wake-conditions matched" signal which can be used to bring the node back to its normal operation state at block 505. Such a signal may be used to switch the node's power source(s), as well as initiating other types of wake-up actions are required (e.g. restoring node memory contents) as needed. Since wake-up processing may be complex, it may be completed by a node-resident microcontroller which remains active during the standby state. The specifics regarding such a microcontroller have not been included so as not to obscure the present invention.

To complete the wake-up processing, the target node's return to normal operating state should be noted in any bus power state descriptor tables at block 515. If an internal event awakens the node, the self-waking node notifies the bus power manager at block 510 that the node has resumed normal operation, assuming that a bus power manager exists. The freshly-awakened node can send this notification using normal bus signaling (e.g., 1394 packets) as the final phase of wake-up processing. The specific protocol for performing such notification is implementation-specific, and would be understood by one skilled in the art. If a standing-by node awakens in response to a command from the bus power manager, the waking node updates the bus power state tables at block 515 to return the waking node to normal operation.

Figure 6:
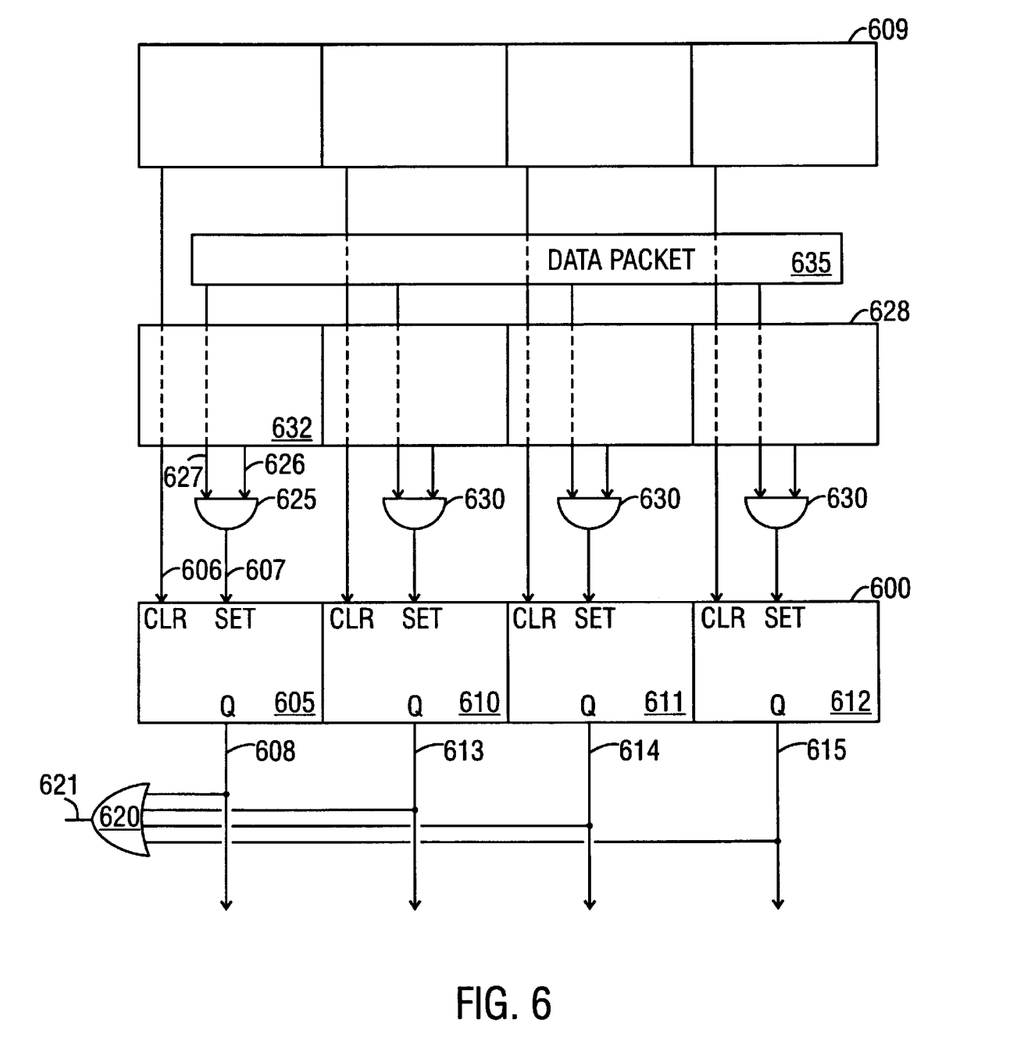
FIG. 6 is a block diagram for a filtering mechanism according to the present invention.

One skilled in the art will appreciate that several mask-filtering mechanisms may be used to determine the type of access requests that can awaken a standing-by node. FIG. 6 illustrates one possible configuration of "wake-filtering" logic. Though many filter-logic configurations are possible, the invention relates to any "filtering" logic that is used to determine whether an occurrence of a given type of wake event actually results in production of a wake signal to a standing-by node.

A "wake event" register 600 has a section 605, which has two input terminals 606, 607 and an output terminal 608. The input terminal 606 may be designated as the clear input terminal in which the application of a logic signal (e.g., a logically high signal) to the terminal 606 will clear the contents of the section 605 of the register 600. A signal may be applied to the terminal 606 by writing a logic one to a corresponding portion 631 of an "event clear" register 609. Similarly, the input terminal 607 may be designated as a set input terminal.

The set signal for storage portion 605 of the wake event register 600 is produced by an AND gate 625. One of the input signals of the AND gate 625 is derived from a portion 632 of "wake event mask" register 628. If the storage location corresponding to the portion 632 is programmed with a logic zero, then output signal 607 cannot assume a logical value of 1, precluding storage portion 605 and specifically output signal 608 thereof from assuming a logical value of 1. System software can program a mask bit within the portion 632 to a logic one or logic zero, to determine whether or not (respectively) the wake event represented by storage portion 605 will produce a wake signal to the node.

The input terminal 627 of the AND gate 625 is driven by the contents of the data field within the data packet 635 which is received from the node logic and which signals the occurrence of a particular type of potential wake event. For example, signal 627 might be driven by the output of a node battery-level indicator that is designed to become active when the storage charge falls below some critical threshold level. In this example, the circuitry which constitutes a vertical "slice" containing the storage portion 605 of FIG. 6 is used to control the production of a wake signal based on a critically low battery level. Other vertical slices through the diagram may control wake signal production due to system-console key-presses, LAN wake-packets, data errors, etc.

The input terminal 627 may be driven from control points within a standing-by node or by a node memory location whose contents reflect the contents of a potential received wake-up packet (i.e. a packet whose address matches that of a location within the standing-by node). In the latter case, specific packet "payload" bits may represent specific types of wake events; for example, one such bit may represent an active wake request from the bus power manager. Such a scheme allows the software to represent and assert any desired type of wake event. The specific nature of an associated software protocol will vary, based on the nature of the wake events which may occur within a given system. One skilled in the art will appreciate that the section 605 may be designed to function as a conventional set-reset (SR) latch, the specifics of which have not been included. By using the clear and set input terminals 606, 607, values may be stored and removed from the section 605 of the register 600, which may correspond to the presence (i.e. occurrence) or absence of a qualifying wake-up event. The storage and removal of signals control the signals applied to the section output terminal 608. One skilled in the art will appreciate that the sections 610–612 of the register 600 (i.e., stereotypical vertical slices through the diagram) function essentially the same way, generating output signals on the terminals 613–615, respectively, when corresponding wake-up criteria are met.

The output terminals 608, 613–615 all serve as inputs to an OR gate, 620, which has an output terminal 621. When at least one of the inputs to an OR gate is a logically high signal, the output signal on the output terminal is a logically high signal. The output signal on the cable 621 may be designated as a node wake signal. Whenever the terminal 621 becomes active (i.e. assumes a logical value of one), it represents the occurrence of at least one of the wake conditions which have been programmed for the associated standing-by node, or to a particular collection of units, or to the node as a whole. Individual units within a node may have their own dedicated wake-up filtering logic, so that each unit can respond to a different set of wake-up conditions. Since the wake-up logic configuration of different nodes may vary, this disclosure will not restrict itself to a particular configuration.

In this manner, the data within a wake request is analyzed to determine if the request meets the predefined (i.e. currently-programmed) wake-up criteria. If so, an active wake signal is sent from the wake logic circuit to the targeted unit(s) or entire node. Alternatively, the wake logic circuit may be designed such that it allows specific types of accesses to a standing-by node without awakening the standing-by node. For example, it could be designed such that READ requests that are sent remotely to specific bus-interface registers on this standing-by node enable the request to be completed without awakening the standing-by node. This could be used to make status information about a standing by node available on the bus, without unnecessarily or unintentionally awakening the node.

Figure 7:
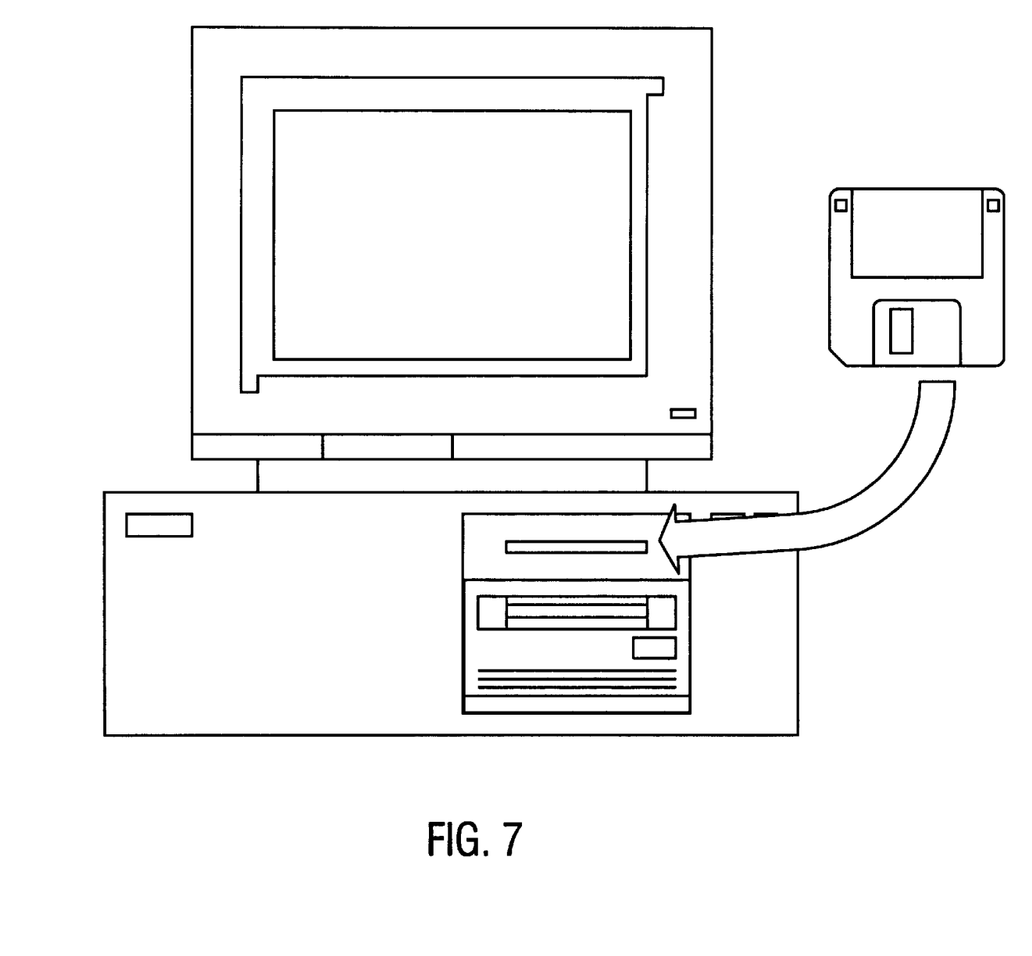
FIG. 7 is a system for implementing a method according to the present invention.

The present invention enables the power consumed by a node coupled to a bus to be significantly reduced by enabling one or more of those units to enter a low power state (e.g., during periods of nonuse). The invention allows such power savings to be achieved, while satisfying the signal-relay requirements of buses such as the IEEE 1394-1995 high-speed serial bus, allowing the bus to sustain normal signaling between nodes even when intervening nodes may be in a low-power standby state. Additionally, a method in accordance with the invention allows the standing-by node to be awakened when specific software-selected significant events occur (e.g., a unit reaching a critically low power level). Once skilled in the art will appreciate that the present invention may be implemented in an actual logic circuit (i.e., using hardware, firmware), as a program (i.e., using software) within a programmable storage device (e.g., a floppy disk, RAM, ROM, etc.) that is readable by a computer system as shown in FIG. 7, or as some combination of these. The resulting power reduction may also ameliorate thermal-dissipation problems experienced by power-constrained systems, such as notebook computers.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed is:

1. A method for reducing the power consumed by a bus comprising:
    placing a bus node in a reduced power consumption state wherein the signaling integrity of a multiport bus interface continues such that the multiport bus interface forwards messages received when the bus node is in the reduced power consumption state; and
    returning the bus node from the reduced power consumption state to a fully powered state upon receiving one of a plurality of wake events that may serve other purposes as normal signaling on the bus.

2. The method of claim 1 further comprising:
    responding from the bus node to an access request originating in another bus node such that when the bus node is in the fully powered state, the request is acknowledged in a normal manner, and when the bus node is in the reduced power consumption state, the request is retried later.

3. The method of claim 1 further comprising:
    switching from a first power source to a second power source responsive to receiving one of the plurality of wake events.

4. The method of claim 1 further comprising:
    switching from a first power source to a second power source responsive to a signal to enter the reduced power consumption state.

5. The method of claim 1 wherein the bus node is a bus node for an internal device.

6. An apparatus comprising:
    a complex logic to control whether the apparatus is in a fully powered state or a reduced power state;
    a link circuit coupled to the complex logic; and
    a physical layer (PHY) coupled to the link circuit to provide a bus interface, wherein the PHY and the link circuit remain active when the apparatus is in the reduced power state such that the apparatus acts as a repeater for traffic on the bus.

7. The apparatus of claim 6 further comprising:
    a plurality of registers in which an indication of a power state of the apparatus is retained.

8. The apparatus of claim 6 further comprising:
    a switch to switch a power source of the PHY and the link circuit from a first power source to a second power source when the complex logic signals the apparatus to enter the reduced power state.

9. The apparatus of claim 6 further comprising:
    a switch to control power supplied to the PHY and the link circuit responsive to the complex logic signaling the apparatus to enter the reduced power state.

10. The apparatus of claim 6 further comprising:
    at least one unit coupled with the complex logic to instruct the complex logic when the apparatus should enter the reduced power state.

11. The apparatus of claim 6 further comprising:
    at least one unit comprising the complex logic to instruct the complex logic when the apparatus should enter the reduced power state.

12. The apparatus of claim 6 further comprising:
    at least one unit coupled with the complex logic; and
    a plurality of registers writeable by the unit and readable by the complex logic to provide information to the complex logic, the complex logic to determine whether the apparatus should be in the reduced power state or the fully powered state based on the information in the registers.

13. An apparatus comprising:
    a complex logic to control which of a plurality of power states the apparatus is in;
    a link circuit coupled to the complex logic; and
    a physical layer (PHY) coupled to the link circuit to provide a bus interface, the apparatus to act as a repeater for traffic on the bus when the apparatus is in one of the plurality of power states.

14. The apparatus of claim 13 further comprising:
    a plurality of registers accessible by the complex logic; and
    a plurality of event data received by the link circuit from the PHY, the complex logic to set a power state of the plurality of power states based on a control data in the registers and the event data.

15. An apparatus comprising:
    a physical layer to provide access to a bus and to capture events from the bus;
    a link circuit coupled to the physical layer to receive events from the bus via the physical layer and to extract an event data from the events; and
    a complex logic capable of accessing a plurality of registers, the complex logic coupled to the link circuit to control which of a plurality of power states the apparatus is in based on a control data in the registers and the event data received from the link circuit.

16. The apparatus of claim 15 wherein the events comprise a plurality of normal signaling on the bus.

* * * * *